Patented Sept. 21, 1943

2,330,174

UNITED STATES PATENT OFFICE 2,330,174

HYDROGENATION-CATALYST REACTIVATION

Karl H. Hachmuth, Bartlesville, Okla., assignor to Phillips Petroleum Company, a corporation of Delaware No Drawing. Application December 11, 1939, Serial No. 308,725

5 Claims. (Cl. 252—244)

This invention relates to the commercial nondestructive hydrogenation of unsaturated hydrocarbons. It relates particularly to an active and rugged catalyst suitable for the hydrogenation of various organic compounds, and more particularly to the reactivation of such a catalyst.

It is an object of this invention to provide a catalyst that has a high activity in reactions wherein hydrogen is introduced into an organic compound.

Another object of my invention is to reactivate a deactivated nickel-containing catalyst.

Still another object of my invention is to reactivate a nickel-copper-alumina catalyst which has become deactivated for promoting the nondestructive hydrogenation of unsaturated hydrocarbons.

It is another object of my invention to produce paraffinic motor fuels from low molecular weight polymers of normally gaseous olefin hydrocarbons.

Other objects and advantages of my invention will become apparent as the following disclosure and discussion proceed.

It has long been known that pure olefin hydrocarbons may be readily hydrogenated to paraffin hydrocarbons in the vapor phase and in the presence of a catalyst such as finely divided metallic nickel. It has also long been known that unsaturated fatty acids and fats may have their olefinic linkages saturated with hydrogen by reaction in the liquid phase and in the presence of finely divided catalysts such as finely divided metallic nickel and the like. These latter materials have such high boiling points that it is impossible to treat them in the vapor phase without the occurrence of extensive deleterious side reactions such as those of decomposition, and it is possible to treat them at a suitable hydrogenation temperature without the application of more than very moderate pressures by treating them in the liquid phase.

Modern internal combustion, spark ignition engines require fuels which do not appreciably detonate, that is they operate best on fuels which have high octane numbers. The detonation characteristics of hydrocarbons used as fuels vary quite widely with their molecular species; that is whether they are paraffinic, olefinic, naphthenic, or aromatic; with their molecular structure, that is whether the molecules of the hydrocarbons relatively are simple or highly branched in structure; their molecular weight; and with their concentrations in admixture with other hydrocarbons. Many fuels are more or less complex mixtures of hydrocarbons, and this last variable is often of considerable importance. In addition to these factors relating directly to detonation, other characteristics which must be considered are the stability of the hydrocarbon in the fuel to gum and color formation after prolonged storage in contact with air and/or water, and the susceptibility to additions of tetraethyl lead and other antidetonating agents, that is, the amount of increase in the octane number of a motor fuel upon the addition of a given quantity of an agent such as the familiar tetraethyl lead.

It has been found that paraffin hydrocarbons which are normally liquid, which boil below about 400° F. and which have one or more branches in their molecular structure are ideal for fuels for high compression engines. Such hydrocarbons are extremely stable during long storage, they have high octane numbers in the pure state and the effect of these high octane numbers is not appreciably lost on blending, and it is possible to increase the octane number of a fuel consisting of such hydrocarbons considerably by adding only small amounts of an agent such as tetraethyl lead.

Olefin hydrocarbons corresponding to such desirable paraffin hydrocarbons are now readily prepared by the catalytic polymerization of lower molecular weight olefins. Thus, diisobutylene, corresponding to the well known isooctane, 2,2,4-trimethyl pentane, is readily prepared by polymerizing isobutylene. Other branched octenes may be prepared by the polymerization of normal butenes and by the copolymerization of isobutylene and normal butenes. Similarly other olefins, of both higher and lower molecular weights, may be prepared by the polymerization of olefins and mixtures of olefins having low molecular weights. The olefin hydrocarbon products produced by the simple catalytic polymerization of such low molecular weight olefins vary not only with the original olefins and mixtures of olefins but also with the operating conditions during polymerization and the catalysts used. Thus, commercial products will vary from essentially pure diisobutylene, mixed with a little triisobutylene, to complex hydrocarbon mixtures containing olefins having from about six to about twelve or more carbon atoms per molecule. Most generally it is such more or less complex mixtures which are produced by commercial polymerization processes.

In order to produce, from low molecular weight olefins, motor fuels which are paraffinic, have high octane numbers and are greatly improved by the additions of small amounts of tetraethyl lead, it has been found desirable to polymerize such olefins and subsequently to hydrogenate the olefin polymers. It has been found that a catalyst suitable for the hydrogenation of commercial mixtures of unsaturated hydrocarbons in the gasoline boiling range such as olefin polymers, is prepared by forming an intimately associated mixture of nickel oxide, copper oxide and aluminum oxide upon an inert support and treating this material with hydrogen. Such a catalyst will be hereinafter referred to as a nickel-copper-alumina catalyst.

An advantageous method of preparing such a catalyst is to prepare an aqueous solution containing nickel nitrate, copper nitrate, and aluminum nitrate, mixing with this solution a granulated inert support such as granular pumice stone, and evaporating the water from this mixture. Such an evaporation may be accomplished by heating this mixture to an elevated temperature in the neighborhood of its boiling point and constantly stirring it as it boils and the water evaporates. As the water evaporates the solution becomes more and more concentrated with respect to the salts contained therein, and finally the various nitrates are deposited out upon the inert support which is present. As the evaporation continues this deposition progresses until all of the nitrates are deposited upon the surfaces of the particles of the support and the coated or impregnated support finally becomes dried. After treatment with such a solution, the nitrates are decomposed in a stream of air, the temperature gradually being raised until a final temperature between 400 and 800° F., preferably about 550 to 750° F., has been attained. During this decomposition the nitrates which were deposited upon the inert support are decomposed and the intimate mixture of the oxides of the various metals remain upon the catalyst. The decomposition of these nitrates is accompanied by the formation of nitrogen oxides which are very corrosive and obnoxious and this operation is preferably carried out with the coated particles of the support upon trays which are provided with adequate means of ventilation so that these nitrogen oxides are carried away without injury to surrounding equipment or people.

A modified method of preparing such a catalyst is to soak a body of support such as pumice, composed of particles passing a standard 4 mesh sieve and retained by a 10 mesh sieve, in a concentrated aqueous solution of the nitrates for a half-hour or more, at ordinary temperatures, such as about 50 to 100° F. After such soaking, the impregnated support is removed from the solution, is dried and heated to an elevated temperature of 400° F. or more, whereby the nitrates are decomposed forming the corresponding oxides. The resultant material is then again treated by soaking it in an aqueous solution, concentrated with respect to the same salts, removing the treated material and again drying it and decomposing the nitrates. This process is repeated until a desired amount of the metals in the form of metal oxides is associated on and with the support. In the case of ordinary pumice, two or three such treatments generally suffice to make a very active and durable catalyst, containing between about 1.5 and 5 pounds of nickel per gallon of support, preferably about 3 pounds of nickel per gallon of support.

After the nitrates have been substantially decomposed, only an intimate mixture of metallic oxides remains deposited on the particles of the support. The mixture is then treated with hydrogen at a more or less elevated temperature. This treatment is preferably carried out with the particles of material to be treated placed within the hydrogenation chamber in which the catalyst is subsequently to be used. The treatment is accomplished by passing hydrogen, or a mixture containing hydrogen, over the catalyst. It has at times been found that it is advantageous to treat the mixture of metal oxides with hydrogen only at a low temperature, such as is obtained by heating the mixture of oxides from atmospheric temperature to an initial reaction temperature while passing the reaction mixture through the chamber. At the start of such a treatment, very little reaction takes place, and the effluents are about as unsaturated as the material charged. However, at about 400° F. the hydrogenation reaction starts, as evidenced by a completely saturated product, and the temperature is then immediately lowered as much as 100° F. or more, to the lowest temperature which will give the desired rate of reaction, by lowering the temperature of the charge stock, and process continued at this lower level. Subsequently, if unsaturation tends to appear in the product, the temperature of the process may be slightly raised.

Although pumice stone has been mentioned as a support, it is of course understood that any other desirable or available inert support, such as porous porcelain, dried silica gel, quartz, infusorial earth, asbestos, wood charcoal, activated alumina, and the like, may be used. Such supports are not full equivalents of each other, but produce catalysts which are quite similar. Although activated alumina may be used as a support, it has not been found that the deposition of a mixture of nickel and copper oxides or hydroxides or the like upon activated alumina will produce a catalyst at all similar to or the equivalent of such a nickel-copper-alumina catalyst as is herein described.

Also it has been found that although it is important that the oxides of nickel, copper and aluminum should be intimately mixed together before reduction, they need not always be formed by decomposition of the nitrates. Thus, alternative but not completely equivalent methods of preparation include the coprecipitation of compounds of these metals upon supports from a solution of them which has been treated with an alkali, an alkaline carbonate or the like. Coprecipitates so formed may be dried and heat treated and subsequently treated with hydrogen, as described in connection with the nitrates.

The catalyst so prepared consists of an intimate mixture which contains metallic nickel and metallic copper and aluminum oxide, although since it has been prepared by reducing a mixture of the metal oxides, it may also at times contain various amounts of nickel oxide or of copper oxide or both. In any event, it has been found that a catalyst prepared in this manner is highly active in promoting the nondestructive hydrogenation of olefin hydrocarbons in the motor fuel boiling range. It is also active in promoting the addition of hydrogen to all hydrocarbons in this boiling range which have unsaturated linkages between two adjacent carbon atoms, such as unsaturated naphthenes and aromatics such as benzene. Such hydrogenation treatment may be carried out with the hydrocarbons to be treated either in the vapor or liquid phase or under mixed phase conditions. In any case it is preferable that the hydrogenation process be carried out at a super-atmospheric pressure of the order of 50 to 2000 pounds per square inch, preferably of the order of 750 to 1000 pounds per square inch and at temperatures between about 200° F. and about 700° F., although at the higher temperature some decomposition reaction of the hydrocarbons may begin to take place. With some charge stocks and with very active catalysts, only a small superatmospheric pressure may be necessary. The most desirable conditions of temperature and pressure for any particular case may be readily determined by trial by one skilled in the art. Such a catalyst has been described by Thomas G. Strickland in his application Serial No. 240,196, filed November 12, 1938, entitled "Hydrogenation catalyst and process," now U. S. Patent 2,242,627, granted May 20, 1941.

Although a nickel-containing catalyst, such as the nickel-copper-alumina catalyst herein described, is highly active in the hydrogenation of organic compounds, and especially in promoting the nondestructive saturation of unsaturated carbon-to-carbon linkages in hydrocarbons, it gradually loses activity during use and finally becomes substantially ineffective for promoting the desired reaction. While this loss in activity is undoubtedly partly due to the accumulation of carbonaceous material on the surface of the catalyst, it appears that this may not be the only cause for this loss of activity, or deactivation, and may not even be the principal cause. However, it is not known as yet exactly what other conditions or side-reaction products may contribute to this deactivation, but this does not alter the advantages to be gained from using my reactivating process. The decline, or deactivation, of the hydrogenation catalyst does not occur suddenly, but takes place gradually over an extended period of time. In general, a catalyst is arbitrarily declared to be deactivated, and therefore ready for treatment by my reactivation process, at some point in its use, where to continue to use it is less economical than to reactivate it. This requires taking into consideration the increasing temperatures and/or pressures required for continued use, the appearance or undesirable increase of unsaturated material in the products, the increase of undesirable side reactions, and the like, and is readily determined by trial for any particular operation. As will be more specifically shown hereinafter, the deactivated catalyst may be restored to activity, or regenerated, by a burning out procedure wherein air is passed over the catalyst at an elevated temperature, but the activity of a catalyst regenerated in this manner is not nearly as great, nor as stable, as was the activity of the freshly prepared catalyst.

I have now found that it is possible to reactivate such a deactivated nickel-containing catalyst by treating it with an aqueous solution containing nickel nitrate, or its equivalent. This reactivation is carried out on the deactivated catalyst directly, without any intermediate tedious and time consuming steaming-out or burning-out procedure. In applying my reactivation, the deactivated catalyst is removed from the catalyst chamber, placed in a suitable vessel, and treated with an aqueous solution such that between about 5 and 20 per cent as much nickel, as nickel nitrate, as is contained on the body of catalyst being treated, is absorbed on or by this deactivated catalyst. If other active materials are incorporated with nickel in the catalyst, such as copper and/or aluminum, I prefer to incorporate nitrates of such metals in the reactivating solution as well. Also, the ratio of such metals to nickel should be substantially the same, in the reactivating solution, as is the ratio of these metals on the original catalyst. One method is to heat the slurry so that a slow boiling takes place, and to continue the treatment until the water has entirely evaporated, limiting the original solution to that amount which contains only the amount of the nitrates to be incorporated on the catalyst. I have been able to secure the most satisfactory results, however, by treating the catalyst with a concentrated solution at room temperature for a half-hour to an hour or more, or as long as is necessary for it to absorb the desired amount of salts, separating it from the solution and drying it. The extent of soaking can be readily determined by the examination of small test portions. After treating it with the reactivating solution and drying it the material is heated to an elevated temperature, such as between about 400 to 800° F. preferably 600 to 750° F. and the nitrates present are decomposed. This heating is continued until there is no further evolution of nitrogen oxides. The material is reduced in any suitable manner, such as was used in the preparation of the original catalyst, and is then used to effect a catalytic hydrogenation. In some cases, the deactivated catalyst should be screened or sieved to remove fine, powdery material before the reactivation treatment is carried out on the main body of catalyst.

While beneficial results will be obtained by insuring that anywhere between 5 and 20 per cent of the original metal is deposited upon the deactivated catalyst, I have found that satisfactory results are obtained when the treatment is such that about 10 per cent as much of the metals are absorbed or deposited on the catalyst as were associated on the body of the original catalyst, which is being reactivated. In case less than this amount of metal is used, it is well to add some nitric acid to the reactivating solution. This procedure may also be used at other times, especially if the catalyst has been badly deactivated. The beneficial results which are obtained appear to be partly due to the addition to the catalyst of small amounts of nickel and partly to the other chemical and mechanical reactions which occur during the subsequent decomposition of the nitrates. A nickel-containing hydrogenation catalyst may be reactivated a number of times in the manner herein disclosed without burning off any of the carbonaceous material which forms on it during its use; however, after several such reactivations, it may be necessary to burn off the catalyst and then reactivate it and/or to dissolve the metals off the support with nitric acid, or to recover the metals in some other manner, and to re-prepare the catalyst.

The following is cited as an example of the application of my invention. An active nickel-containing catalyst, wich will be termed a nickel-copper-alumina catalyst, was prepared by first making up an aqueous solution which contained 1.5 pounds of nickel nitrate, 0.17 pound of copper nitrate and 2.25 pounds of aluminum nitrate for every gallon of crushed pumice stone subsequently added. This solution contained only enough water to maintain the salt in solution at about room temperature. Crushed pumice stone, which had been graded so that it passed a screen having 6 mesh to the inch and was retained by a screen having 8 mesh to the inch, was added to this aqueous solution and the mixture, or slurry, was heated until the water was boiling, the mixture being thoroughly stirred all the while. This heating and stirring was continued until all the water had evaporated, leaving behind pumice stone on which there was deposited in intimate mixture the various nitrates just enumerated. This mixture was then heated to a temperature between 660 and 750° F. while passing air over it, whereby the nitrates were decomposed and a residue of intimately associated metal oxides was left upon the pumice granules. These oxides were then reduced by passing hydrogen over the material at about atmospheric pressure and at a temperature of about 680° F. The catalyst prepared in this manner contained 0.308 pound of nickel per gallon of catalyst.

The catalyst so prepared was then used to hydrogenate olefin hydrocarbons which are normally liquid and boil below about 400° F., in admixture with 3 volumes of paraffinic hydrocarbons having approximately the same boiling range. This hydrocarbon mixture was passed over a bed of the catalyst at a flow rate of 2 gallons of olefin per gallon of catalyst per hour, with enough hydrogen to have the effluent of the catalyst chamber contain 50 mol per cent of hydrogen. The pressure was maintained between 750 and 1000 pounds per square inch, thus insuring that a large part of the hydrocarbon material remained in the liquid phase. The temperature at the inlet of the catalyst chamber was initially maintained at about 406° F., and as the process continued and the catalyst became deactivated, the inlet temperature was gradually raised so as to keep the olefin content of the effluent at a low value. When it had been raised to about 500° F., the catalyst was declared to have become deactivated sufficiently to warrant a reactivation treatment. The exit of the catalyst chamber initially was at a temperature of about 570° F., and at the end of the run was at about 680° F. A total of 94 gallons of olefin per gallon of catalyst had passed through the catalyst chamber, and the olefin content of the combined hydrocarbon effluent was less than 1.5 per cent.

This deactivated catalyst was reactivated by cooling it, without any steam treatment or burning out such as is often done with deactivated catalyst, and immersing it in an aqueous solution containing 10 per cent as much of nickel nitrate, copper nitrate and aluminum nitrate as had been used in the original activation treatment. The mixture was treated and stirred until all water had evaporated. The resultant material was then heated to a temperature between 650 and 750° F. while passing air over it, whereby a residue of intimately associated metal oxides was left upon the pumice granules, and hydrogen was then passed over the material at a temperature of about 680° F. This material was then used as a catalyst under the conditions previously discussed. The initial inlet temperature was about 390° F., the effluent temperature being about 470° F. The temperature was raised as the catalyst became deactivated, and the run was finally terminated when the inlet temperature had been raised to 580° F., the effluent being about 620° F. at this time. A total of 115 gallons of olefin per gallon of catalyst was treated in this run and the olefin content of the combined effluent was about 1.4 per cent.

As a comparative test, another catalyst was prepared in a manner similar to that just described, except that the catalyst contained 0.616 pound of nickel per gallon of catalyst. This material effected the hydrogenation of 140 gallons of olefin per gallon of catalyst, in the vapor phase at a temperature between 390 and 660° F. After it was deactivated, an attempt was made to reactivate it by passing a 50-50 mixture of air and steam over it at a temperature which was raised from 700 to 915° F. during the reactivation, the temperature being raised at a rate such that there was a steady evolution of carbon dioxide. After this treatment, hydrogen was passed over the catalyst at 680° F. The resulting catalyst was very active when first tested but when only 35 gallons of olefin per gallon of catalyst had been completely hydrogenated, the activity began to decline rapidly, and when 42.5 gallons of olefin per gallon of catalyst had been passed through the process, at a final catalyst temperature of 527° F., the combined effluent had an olefin content of 2 per cent.

While the discussion of my invention has been made mainly in connection with nickel-containing catalysts which having been prepared from nitrates, as brought out in the previous discussion it is possible to prepare such catalysts by other methods, such as the deposition of various metal carbonates, hydroxides and the like upon a suitable support. My method of reactivation is also applicable to deactivated catalysts which have been prepared in one of these alternative manners. However, regardless of the method by which the original catalysts was prepared, it is necessary to use a reactivation solution comprising nitrates, or containing large amounts of the nitrate ion. In any particular case, optimum conditions and concentrations may be readily determined by trial.

I claim:

1. A process for the reactivation of a nickel-containing hydrogenation catalyst which has become deactivated and contaminated with a carbonaceous deposit, which comprises treating said deactivated and contaminated catalyst with a concentrated aqueous solution containing added nickel nitrate, continuing said treatment for a time such that the amount of nickel absorbed from said solution is between about 5 and 20 per cent of the amount of nickel initially in the body of deactivated catalyst being treated, drying said treated material and heating it to an elevated temperature to decompose nitrates, and subsequently submitting the resultant material to the action of a hydrogen-containing medium.

2. A process for the reactivation of a hydrogenation catalyst comprising an intimate association of nickel, copper, and alumina deposited upon a support and which has become deactivated and contaminated with a carbonaceous deposit, which comprises treating said deactivated and contaminated catalyst wtih an aqueous solution containing added nitrates of nickel, copper, and aluminum, said metals being in substantially the same ratio as they are upon said deactivated catalyst, continuing the treatment for a length of time such that the amount of said metals absorbed on said deactivated catalyst from said solution is between about 5 and 20 per cent of the amount initially in the body of deactivated catalyst being treated, drying said treated material and heating it to a temperature between 400 and 800° F. to decompose nitrates, and subsequently reducing the residue in the presence of free hydrogen.

3. A process for the reactivation of a hydrogenation catalyst comprising an intimate association of nickel, copper and alumina on a support and which has become deactivated and contaminated with a carbonaceous deposit, which comprises treating said deactivated and contaminated catalyst with an aqueous solution containing the added nitrates of nickel, copper and aluminum, said metals being in substantially the same ratio as they are upon said deactivated catalyst, the amount of said metals in said solution being about 10 per cent of their amount in the body of deactivated catalyst before said treatment, heating and evaporating said solution while intimately associated with said deactivated catalyst, drying said treated material and heating it to a temperature between 600 and 750° F. to decompose nitrates, and subsequently reducing the residue in the presence of free hydrogen.

4. A process for the reactivation of a hydrogenation catalyst comprising an intimate association of nickel, copper, and alumina on a support and which has become deactivated and contaminated with a carbonaceous deposit, which comprises treating said deactivated and contaminated catalyst with an aqueous solution containing added nitrates of nickel, copper, and aluminum, said metals being in substantially the same ratio as they are upon said deactivated catalyst, continuing said treatment for a length of time such that the amount of said metals absorbed from said solution on the deactivated catalyst is about 10 per cent of their amount on the body of said deactivated catalyst before said treatment, drying said treated material and heating it to a temperature between 600 and 750° F. to decompose nitrates, and subsequently reducing the residue in the presence of free hydrogen.

5. A process for the reactivation of a hydrogenation catalyst comprising an intimate association of nickel, copper, and alumina deposited upon a support which has become deactivated and contaminated with a carbonaceous deposit, which comprises treating said deactivated and contaminated catalyst with an aqueous solution containing added nitrates of nickel, copper and aluminum, said metals being in substantially the same ratio as they are upon said deactivated catalyst, continuing the treatment for a time such that an appreciable but small amount of said nitrates is adsorbed on said deactivated and contaminated catalyst, drying said treated material and heating it to a temperature between 400 and 800° F. to decompose nitrates, and subsequently reducing the residue in the presence of free hydrogen.

KARL H. HACHMUTH.